US009305371B2

(12) United States Patent
Arcas et al.

(10) Patent No.: US 9,305,371 B2
(45) Date of Patent: Apr. 5, 2016

(54) TRANSLATED VIEW NAVIGATION FOR VISUALIZATIONS

(71) Applicant: Uber Technologies, Inc., San Francisco, CA (US)

(72) Inventors: Blaise Aguera y Arcas, Seattle, WA (US); Markus Unger, Graz (AT) (US); Donald A. Barnett, Monroe, WA (US); Sudipta Narayan Sinha, Redmond, WA (US); Eric Joel Stollnitz, Kirkland, WA (US); Johannes Peter Kopf, Bellevue, WA (US); Timo Pekka Pylvaenaeinen, Menlo Park, CA (US); Christopher Stephen Messer, Denver, CO (US)

(73) Assignee: Uber Technologies, Inc., San Francisco, CA (US)

( * ) Notice: Subject to any disclaimer, the term of this patent is extended or adjusted under 35 U.S.C. 154(b) by 156 days.

(21) Appl. No.: 13/804,543

(22) Filed: Mar. 14, 2013

(65) Prior Publication Data
US 2014/0267343 A1    Sep. 18, 2014

(51) Int. Cl.
*G06T 11/00* (2006.01)
*G06T 15/04* (2011.01)
*G06T 19/00* (2011.01)

(52) U.S. Cl.
CPC .............. *G06T 11/001* (2013.01); *G06T 15/04* (2013.01); *G06T 19/003* (2013.01)

(58) Field of Classification Search
CPC ..... G06T 11/001; G06T 15/04; G06T 3/4038; G06T 2207/20212; G06T 2207/20221; G06T 7/0024; G06T 7/003; G09G 5/377
See application file for complete search history.

(56) References Cited

U.S. PATENT DOCUMENTS

| 6,044,181 | A | 3/2000 | Szeliski et al. |
| 6,084,592 | A | 7/2000 | Shum et al. |
| 6,222,555 | B1 | 4/2001 | Christofferson et al. |
| 6,246,412 | B1 | 6/2001 | Shum et al. |
| 6,271,855 | B1 | 8/2001 | Shum et al. |
| 6,359,617 | B1 | 3/2002 | Xiong |
| 6,456,323 | B1 * | 9/2002 | Mancuso et al. ........... 348/218.1 |
| 6,639,596 | B1 | 10/2003 | Shum et al. |

(Continued)

OTHER PUBLICATIONS

"Image Blending and View Clustering for Multi-Viewer Immersive Projection Environments", Jonathan Marbach, Mar. 14-18, 2009, IEEE Virtual Reality, Lafayette, Louisiana, pp. 51-54.

(Continued)

*Primary Examiner* — Antonio A Caschera
(74) *Attorney, Agent, or Firm* — Fenwick & West LLP

(57) ABSTRACT

Among other things, one or more techniques and/or systems are provided for defining transition zones for navigating a visualization. The visualization may be constructed from geometry of a scene and one or more texture images depicted the scene from various viewpoints. A transition zone may correspond to portions of the visualization that do not have a one-to-one correspondence with a single texture image, but are generated from textured geometry (e.g., a projection of texture imagery onto the geometry). Because a translated view may have visual error (e.g., a portion of the translated view is not correctly represented by the textured geometry), one or more transition zones, specifying translated view experiences (e.g., unrestricted view navigation, restricted view navigation, etc.), may be defined. For example, a snapback force may be applied when a current view corresponds to a transition zone having a relatively higher error.

20 Claims, 11 Drawing Sheets

(56) References Cited

U.S. PATENT DOCUMENTS

| | | | |
|---|---|---|---|
| 6,762,769 B2 * | 7/2004 | Guo et al. ............... 345/582 |
| 6,905,218 B2 | 6/2005 | Courchesne |
| 7,006,124 B2 | 2/2006 | Peleg et al. |
| 7,095,905 B1 | 8/2006 | Peterson |
| 7,248,738 B2 | 7/2007 | Ho et al. |
| 7,580,952 B2 | 8/2009 | Logan et al. |
| 7,583,288 B2 | 9/2009 | Uyttendaele et al. |
| 7,683,948 B2 | 3/2010 | Yanof et al. |
| 7,936,915 B2 | 5/2011 | Brown et al. |
| 8,064,559 B2 | 11/2011 | Denk et al. |
| 8,249,390 B2 * | 8/2012 | Park et al. ............... 382/284 |
| 8,250,476 B2 | 8/2012 | Hamilton, II et al. |
| 8,264,504 B2 | 9/2012 | Naimark |
| 8,350,850 B2 | 1/2013 | Steedly et al. |
| 8,620,095 B2 | 12/2013 | Sinha et al. |
| 8,787,700 B1 | 7/2014 | Aly et al. |
| 2004/0104935 A1 | 6/2004 | Williamson et al. |
| 2004/0189849 A1 | 9/2004 | Hofer |
| 2005/0062869 A1 | 3/2005 | Zimmermann et al. |
| 2006/0132482 A1 | 6/2006 | Oh |
| 2007/0008312 A1 | 1/2007 | Zhou et al. |
| 2007/0236514 A1 | 10/2007 | Agusanto et al. |
| 2009/0130762 A1 | 5/2009 | Poliard et al. |
| 2009/0141966 A1 | 6/2009 | Chen et al. |
| 2009/0244062 A1 | 10/2009 | Steedly et al. |
| 2010/0315412 A1 | 12/2010 | Sinha et al. |
| 2011/0311104 A1 | 12/2011 | Sinha et al. |
| 2012/0019614 A1 | 1/2012 | Murray et al. |
| 2012/0099804 A1 | 4/2012 | Aguilera et al. |
| 2012/0127169 A1 | 5/2012 | Barcay et al. |
| 2012/0237111 A1 | 9/2012 | Sinha et al. |
| 2012/0274738 A1 | 11/2012 | Shi et al. |
| 2012/0289826 A1 | 11/2012 | Graumann et al. |
| 2012/0300020 A1 | 11/2012 | Arth et al. |
| 2012/0314040 A1 | 12/2012 | Kopf et al. |
| 2013/0063549 A1 | 3/2013 | Schnyder et al. |
| 2014/0184585 A1 | 7/2014 | Under et al. |
| 2014/0184596 A1 | 7/2014 | Unger et al. |
| 2014/0184631 A1 | 7/2014 | Unger et al. |
| 2014/0267587 A1 | 9/2014 | Arcas et al. |
| 2014/0267588 A1 | 9/2014 | Arcas et al. |
| 2014/0267600 A1 | 9/2014 | Arcas et al. |

OTHER PUBLICATIONS

"Withindows: A Framework for Transitional desktop and Immersive User Interfaces", Alex Hill and Andrew Johnson, Mar. 8-9, 2008, Published in: IEEE Symposium on 3D User Interfaces, 8 pgs.

"Manifold", From Wikipedia, the free encyclopedia, Modified Jan. 3, 2014, 1 pg.

"Mathematics", From Wikipedia, the free encyclopedia, Modified Jan. 24, 2014, 1 pg.

"Topological space", From Wikipedia, the free encyclopedia, Modified Jan. 14, 2014, 8 pgs.

"Euclidean space", From Wikipedia, the free encyclopedia, Modified Jan. 28, 2014, 1 pg.

"Open Packaging Conventions", From Wikipedia, the free encyclopedia, Modified Dec. 27, 2013, 7 pgs.

"Introducing the Office (2007) Open XML File Formats", Frank Rice, May 2006, reprinted from the Internet at: http://msdn.microsoft.com/en-us/library/office/aa338205(v=office.12).aspx, 24 pgs.

"Geometrical Design Concept for Panoramic 3D Video Acquisition", O.Schreer, P. Kauff/ P. Eisert, C. Weissig and J.C. Rosenthal, Aug. 27-31, 2012, 20th European Signal Processing Conference, Bucharest, Romania, pp. 2757-2761.

"Fixing Panorama Alignment in Potoshop C S4", Sean Duggan, Nov. 11, 2009, Layers Magazine, The How-To Magazine for Everything, 12 pgs.

"Panorama Stitching", Dan Stack, Feb. 27, 2012, reprinted from the Internet at: http://dpbestflow.org/image-editing/panorama-stitching, 20 pgs.

"Tips and Tricks from the Pros", Fred Kamphues, Feb. 9, 2013, reprinted from the Internet at: http://www.sandisk.com/consumer/camera-and-camcorder-memory/taking-better-photo-video/panorama-photography/, 2 pgs.

"Calibration of Omnidirectional Stereo for Mobile Robots", Yoshiro Negishi, Jun Miura and Yoshiaki Shirai, Sep. 28-Oct. 2, 2004, Proceedings of 2004 IEEE/RSJ International Conference on Intelligent Robots and Systems, Sandal, Japan, pp. 2600-2605.

"Learn How to Create Gigapixel Macro Photographs", 2011, Gigamacro, 4 pgs.

"Structure and Pose from Single Images of Symmetric Objects with Applications to Robot Navigation", Allen Y. Yang, Wei Hong and Yi Ma, Sep. 14-19, 2003, Proceedings of the 2003 IEEE International Conference on Robotics and Automatics, pp. 1013-1020.

"Virtual Navigation of Complex Scenes using Clusters of Cylindrical Panoramic Images", Sing Bing Kang and Pavan K. Desikan, Sep. 1997, Digital, Cambridge Research Laboratory, Technical Report Series, 30 pgs.

"Photosynth", Feb. 8, 2013, reprinted from the Internet at: http://photosynth.net/about.aspx, 2 pgs.

"Virtual Video Camera: Image-Based Viewpoint Navigation Through Space and Time", C. Lipski, C. Linz, K. Berger, A. Sellent and M. Magnor, 2010, Computer Graphics Forum, vol. 0, No. 0, 12 pgs.

"International Search Report & Written Opinion for PCT Patent Application No. PCT/US2014/023873", Mailed Date: Oct. 9, 2014, 22 Pages.

Geraerts, Roland, "Camera Planning in Virtual Environments Using the Corridor Map Method", In the Second International Workshop on Motion in Games, Nov. 21, 2009, pp. 194-206.

Debevec, et al., "Efficient View Dependent Image-Based Rendering with Projective Texture Mapping", In 9th Eurographics Rendering Workshop, Jun. 1998, 13 Pages.

Reinhard, et al., "Color Transfer between Images", In Publication of IEEE Computer Graphics and Applications, vol. 21 Issue 5, Oct. 2001, pp. 34-41.

Debevec, et al., "Modeling and Rendering Architecture from Photographs: A Hybrid Geometry-and Image-Based Approach", In Proceedings of the 23rd Annual Conference on Computer Graphics and Interactive Techniques, Aug. 1, 1996, pp. 11-20.

Chen, et al., "View Interpolation for Image Synthesis", In Proceedings of the 20th Annual Conference on Computer Graphics and Interactive Techniques, Sep. 1, 1993, pp. 279-288.

Int. Search Report cited in PCT Application No. PCT/US2014/023888 dated Jul. 24, 2014, 10 pgs.

Int. Search Report cited in PCT Application No. PCT/US2014/023915 dated Jun. 10, 2014, 13 pgs.

Int. Search Report cited in PCT Application No. PCT/US2014/023980 dated Jul. 7, 2014, 13 pgs.

"Photo Tourism: Exploring Photo Collections in 3D", Noah Snavely, Steven M. Seitz and Richard Szeliski, Jan. 1, 2006, Siggraph Conference Proceedings, vol. 25, No. 3, pp. 1-11.

"QuckTime(R) VR—An Image-Based Approach to Virtual Environment Navigation", Shenchang Eric Chen, Aug. 6, 1995, Computer Graphics Proceedings, IEEE, pp. 29-38.

"Interactive Digital Photomontage", Aseem Agarwala, Mira Dontcheva, Maneesh Agrawala, Steven Drucker, Alex Colburn, Brian Curless, David Salesin and Michael Cohen, Aug. 2004, ACM Transactions on Graphics, vol. 3, No. 23, pp. 294-302.

"Panorama Weaving: Fast and Flexible Seam Processing", Brian Summa, Julien Tierny and Valerio Pascucci, Jul. 2012, ACM Transactions on Graphics, vol. 31, No. 4, pp. 1-11.

"An Interactive Editing Tool for Correcting Panoramas", Junhong Gao and Michel S. Brown, Nov. 28, 2012, ACM, Siggraph Asia 2012 Technical Briefs, 4 pgs.

"GrabCut—Interactive Foreground Extraction using Iterated graph Cuts", Carsten Rother, Vladimir Kolmogorov and Anrew Blake, Aug. 2004, ACM Transactions on Graphics, vol. 23, No. 3, 309-314.

"Interactive Graph Cuts for Optimal Boundary & Region Segmentation of Objects in N-D Images", Yuri Y. Boykov and Marie-Pierre Jolly, Jul. 2001, Proceedings of the Eighth IEEE International conference on Computer Vision, vol. 1, pp. 105-112.

(56) References Cited

OTHER PUBLICATIONS

"Mosaics of Scenes with Moving Objects", James Davis, Jun. 1998, Proceedings 1998 IEEE Computer Society Conference on Santa Barvara, Ca. Computer Vision and Pattern Recognition, pp. 354-360.
"Image Alignment and Stitching: A Tutorial", Richard Szeliski, Oct. 2004, Internet Citation, reprinted from the Internet at: http://robots.stanford.edu/cs223b05/MSR-TR-2004-92-Jan26.pdf, 71 pgs.
Non-Final Office Action cited in U.S. Appl. No. 13/804,895 dated Feb. 25, 2015, 22 pgs.
Reply Written Opinion cited in PCT Application No. PCT/US2014/023873 dated Jan. 8, 2014, 5 pgs.
"Scene Reconstruction and Visualization from Internet Photo Collections", Keith N. Snavely, 2006, A Dissertation, Submitted in Partial fulfillment of the requirements for the degree of doctor of philosophy University of Washington, reprinted from the Internet at: https://www.cs.cornell.edu/-snavely/publications/thesis/thesis.pdf, 210 pgs.
Eun-Young Kang et al: "Scene transition based on image registration for Web-based virtual tour", Article 33(3) PCT, Proceedings of the Ninth Iasted International Conference on Internet and Multimedia Systems and Applications Aug. 15-17, 2005 Honolulu, HI, USA ACTA Press, Anaheim, Jan. 2005, pp. 41-46, Retrieved from the Internet: URL:http://tlaloc.sfsu.edu/~yoon/PUB/IMSA2005.pdf, 6 pgs.
PCT International Search Report cited in PCT Application No. PCT/US2014/023873 dated Oct. 9, 2014, 23 pgs.
PCT Written Opinion in PCT Application No. PCT/US2014/023915 dated Jan. 5, 2015, 9 pgs.
PCT Written Opinion of the Internal Preliminary Examining Authority in International Application PCT/US2014/023980, mailed Apr. 2, 2015, 9 pgs.
U.S. Appl. No. 13/826,423, Office Action mailed Apr. 23, 2015, 17 pgs.
Written Opinion cited in PCT Application No. PCT/US2014/023888 dated Feb. 12, 2015, 10 Pages.

\* cited by examiner

TRANSLATED VIEW NAVIGATION FOR VISUALIZATIONS

BACKGROUND

Many users may create image data using various devices, such as digital cameras, tablets, mobile devices, smart phones, etc. For example, a user may capture an image of a beach using a mobile phone while on vacation. The user may upload the image to an image sharing website, and may share the image with other users. In an example of image data, one or more images may be used (e.g., stitched together) to generate a visualization of a scene depicted by the one or more images. In one example, the visualization may comprise a panorama, a spin-movie, a multi-dimensional rendering, etc. A visualization interface, such as an immersive viewer, may allow a user to visually navigate within the visualization to explore the scene represented by the visualization.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things one or more systems and/or techniques for defining transition zones for navigating a visualization of a scene are provided herein. That is, a visualization may be constructed from one or more texture images depicting a scene from various viewpoints (e.g., a panorama visualization of a renovated basement may be stitched together from one or more images depicting the renovated basement from various viewpoints). In an example, during navigation within the visualization, a current view of the scene may be derived from a single texture image (e.g., where the texture image depicts the entire current view). In another example, a current view of the scene may be derived from multiple texture images (e.g., a first texture image, depicting a first portion of the current view, and a second texture image, depicting a second portion of the current view, may be projected onto a geometry to create textured geometry representing the scene, such that a current view may be derived from the textured geometry). A geometry may comprise a multi-dimensional representation of a surface of the scene or a portion thereof. In an example, respective texture images of the scene may have corresponding geometry (e.g., a first texture image has a first local geometry, a second texture image has a second local geometry, etc.), and the scene may be represented by a geometry (e.g., a global geometry derived from at least one local geometry). In another example, one or more texture images may share a geometry (e.g., a first texture image and a second texture image may share a first local geometry derived by a stereo matching technique).

In an example, a user may have the ability to "look around" and/or explore the renovated basement by navigating within the visualization. One or more transition zones may be defined for visually navigating the visualization. For example, a first texture image and a second texture image are projected onto a geometry of a scene (e.g., a local geometry of a portion of the scene depicted by the first and second texture images) to create a textured geometry of the scene. A transition space may be derived from the textured geometry. The transition space may correspond to transitional navigation of the scene between the first texture image and the second texture image (e.g., a current view of the scene that does not have a one-to-one correspondence with a single texture image, but is derived from multiple texture images). In an example where a first texture image depicts a gaming area and a sitting area of the renovated basement and a second texture image depicts the sitting area and a hallway area of the renovated basement, a transition space may correspond to a current view that comprises half of the some of the gaming area, the entire sitting area, and some of the hallway area. Thus, the current view may correspond to a translated view derived from the first texture image and the second texture image.

An error basin may be determined for the transition space based upon a visual error measurement. For example, an inaccurate geometry measurement, a resolution fallout measurement, a pixel occlusion measure, a color different measurement, and/or other measurements or image features may be used to identify the visual error measurement. The error basin may correspond to error estimations that visual errors may arise when displaying a current view based upon geometry and/or texture information within the transition space. The error basin may be used to define one or more transitional zones for navigating the visualization. In an example, a first transition zone is defined within the transition space based upon one or more first translated views being below an error threshold within the error basin. The first transition zone may specify a first translated view experience for the one or more first translated views. For example, a user may be allowed to freely navigate between the one or more first translated views because such views may be generated with relatively lower error (e.g., relatively low pixel occlusion, relatively low resolution fallout, etc.). In another example, a second transition zone is defined within the transition space based upon one or more second translated views being above the error threshold within the error basin. The second transition zone may specify a second translated view experience for the one or more second translated views. For example, a user may have restricted navigation between the one or more second translated views because such views may be generated with relatively higher error (e.g., a current view may be transitioned back to the first transition zone during a navigation pause). In this way, an interactive navigation experience of the scene (e.g., represented by the visualization) may be provided. During navigation within the visualization, the user experience may be dynamically defined based upon such transition zones.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
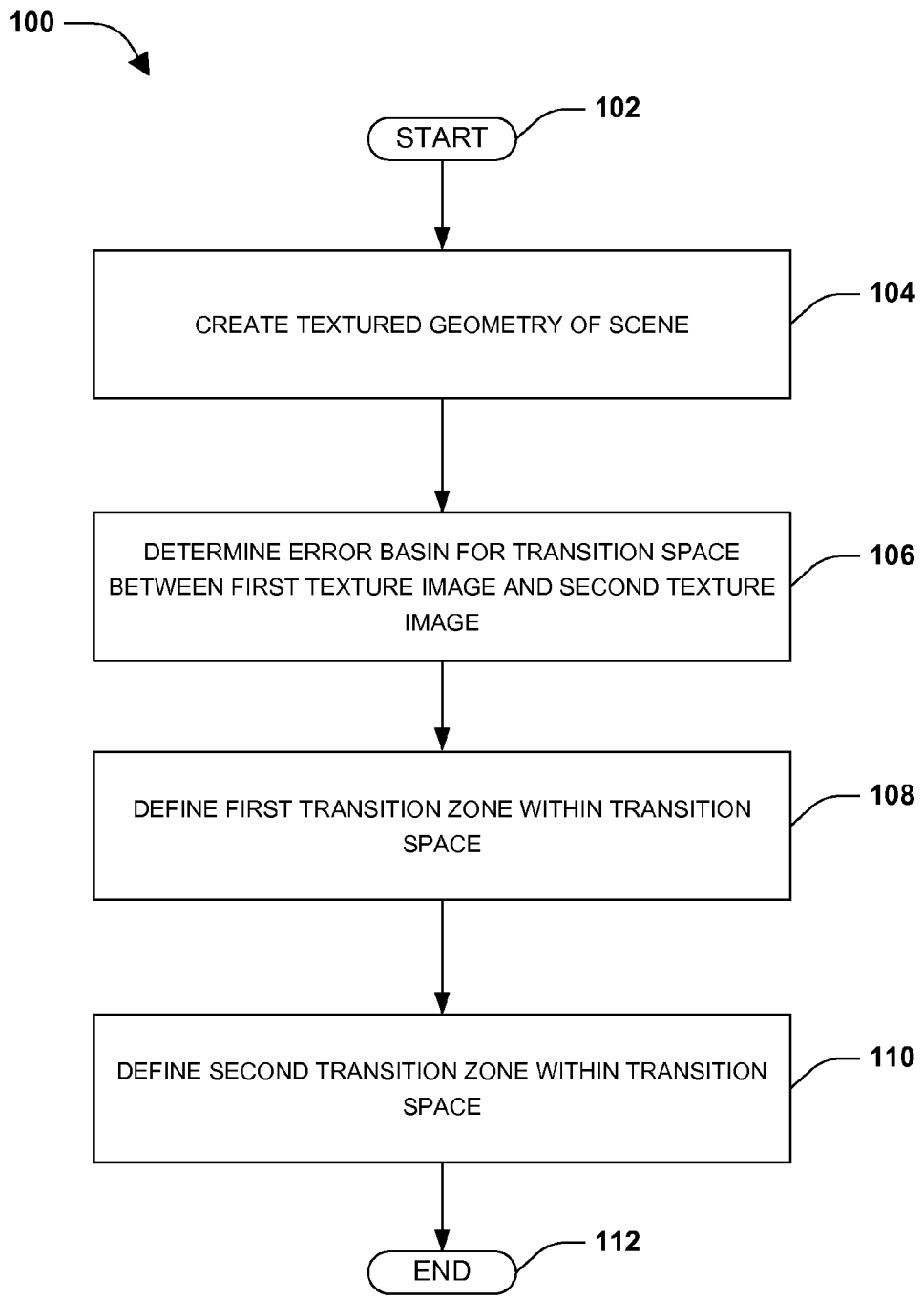
FIG. 1 is a flow diagram illustrating an exemplary method of defining transition zones for navigating a visualization.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of defining transition zones for navigating a visualization is illustrated by an exemplary method 100 of FIG. 1. At 102, the method starts. In an example, a visualization interface may generate a visualization by rendering a scene using imagery (e.g., texture images depicting a scene of a renovated kitchen from various viewpoints) and geometry (e.g., a representation of a multi-dimensional surface of the scene). The geometry may comprise global geometry (e.g., a representation of the entire scene as viewed by texture images depicting the scene) or local geometry (e.g., a representation of a portion of the scene, which may correspond to portions of the scene viewed by one or more texture images). The visualization interface may allow a user to navigate within the visualization to explore the scene (e.g., a user may navigate around the visualization in three-dimensions to see various views of the scene). In an example, a current view, provided by the visualization interface, may correspond to a single texture image, such that the current view is derived from the single texture image (e.g., the current view and the single texture image have a one-to-one correspondence). In another example, a current view may correspond to a view that is not entirely depicted by a single texture image, and thus one or more texture images may be projected onto a geometry to create textured geometry that may be used to derive the current view (e.g., a first portion of the current view is depicted by a first texture image and a second portion of the current view is depicted by a second texture image). A lack of image data, inaccurate geometry, moving objects within the scene during image capture, and/or other issues can result in a relatively unsatisfactory user experience when navigating the visualization (e.g., seam lines, resolution fallout, blurring, etc. may occur when a current view corresponds to textured geometry as opposed to a single texture image).

Accordingly, one or more transition zones for navigating the visualization may be defined. A transition zone may specify a translated view experience that may define how a user may navigate within the visualization (e.g., navigation may be relatively restricted when a current view is derived from a transition zone having a relatively higher error, which may otherwise result in poor visual quality for the current view). At 104, a first texture image and a second texture image (e.g., a panorama image, a photo image, a computer generated image, an orthographic image from an aerial viewpoint, etc.) are projected onto a geometry of a scene to create textured geometry of the scene (e.g., projected onto a global geometry or a local geometry shared by the first texture image and the second texture image). For example, the geometry may correspond to a multi-dimensional surface of a renovated kitchen. The first texture image, the second texture image, and/or other texture images may depict the renovated kitchen from various views. Because the geometry may initially lack texture information, such as color information, the first texture image and the second texture image may be projected onto the geometry to texture the geometry (e.g., assign color values to geometry pixels of the geometry). In an example, the textured geometry may be used to generate a current view of the scene represented by the textured geometry (e.g., the first texture image may depict a first portion of the current view and the second texture image may depict a second portion of the current view, such that the current view can be constructed from the projection of both the first texture image and the second texture image onto the geometry).

At 106, an error basin for a transition space between the first texture image and the second texture image may be determined based upon a visual error measurement. The error basin may correspond to estimated error that may occur when generating translated views between the first texture image and the second texture image (e.g., a translated view that is derived from the textured geometry as opposed to a single texture image). In an example, the error basin may be derived from image features extracted from the first texture image and/or the second texture image. In another example, the error basin may be derived from an inaccurate geometry measurement (e.g., the textured geometry used to create the translated view may have inaccuracies based upon a lack of dimensional information used to construct the geometry), a resolution fallout measurement (e.g., areas of relatively low resolution due to a lack of data), a pixel occlusion measurement (e.g., a geometry pixel of the geometry may not be depicted by either the first texture image or the second texture image, and thus the geometry pixel may not have an accurate color value), a color difference measurement (e.g., the first texture image may provide a first color for a region of the scene based upon a person standing in that region, while the second texture image may provide a second color for the region based upon the person having moved out of the region), or other visual error measurements.

In an example, the error basin may indicate that translated views that are relatively close to the first texture image or the second texture image may have relatively lower error. For example where the first texture image depicts a northern wall of a renovated kitchen, a translated view, corresponding to a slightly offset view of the northern wall, may have a relatively lower visual error because the first texture image may adequately depict the slightly offset view of the northern wall. In another example, the error basin may specify that translated views that are relatively further away from the first texture image and the second texture image may have relatively higher error. For example where the first texture image depicts the northern wall and the second texture image depicts a southern wall, a translated view, corresponding to an eastern wall, may have a relatively higher visual error because the eastern wall may not be adequately depicted by the first texture image and/or the second texture image.

Figure 3A:
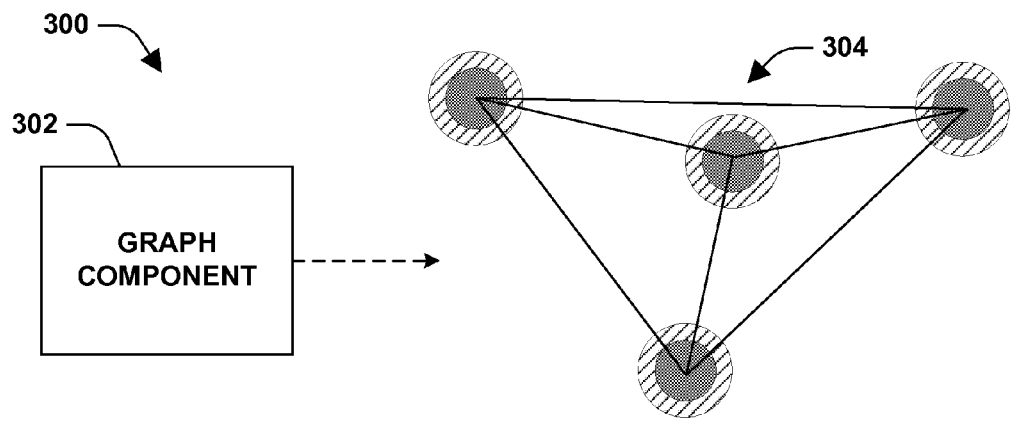
FIG. 3A is an illustration of an example of a first graph.
Figure 3B:
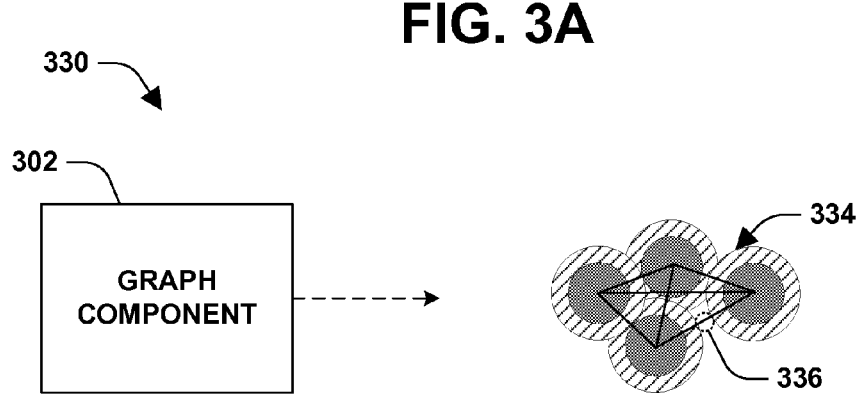
FIG. 3B is an illustration of an example of a second graph.
Figure 3C:
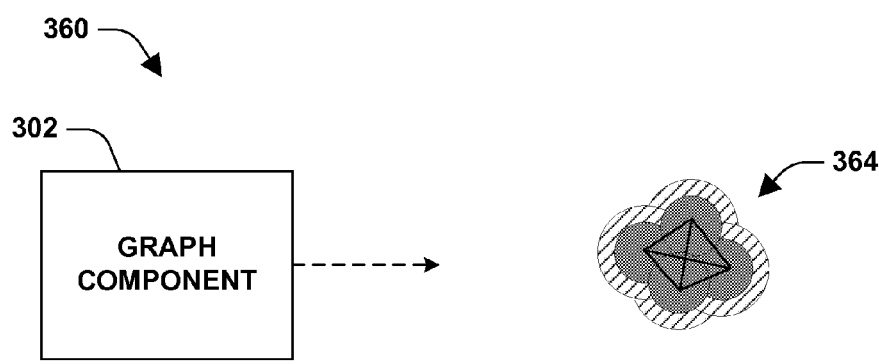
FIG. 3C is an illustration of an example of a third graph.

In some embodiments, a graph may be generated (e.g., FIGS. 3A-3C). The graph may represent one or more texture images available to texture the geometry, and may be navigated when generating a current view to display through the visualization interface. For example, the graph comprises a first node representing the first texture image, a second node representing the second texture image, and/or other nodes representing other texture images. In an example, when a current view corresponds to the first node, then the current view is generated based upon the first texture image. The graph may comprise a transitional edge between the first node and the second node. The transitional edge may correspond to the transition space between the first texture image and the second texture image (e.g., points along the transitional edge may correspond to translated views derived from the textured geometry textured by the first texture image and/or the second texture image). In an example of determining the error basin, a first image feature of a first rendered view (e.g., derived from the textured geometry) of the scene at a first point along the transitional edge may be obtained. A second image feature of a second rendered view (e.g., derived from the textured geometry) of the scene at a second point along the transitional edge may be obtained. A visual error measurement may be determined based upon comparing the first image feature of the first rendered view to the second image feature of the second rendered view (e.g., a color similarity comparison).

One or more transition zones within the transition space may be defined. It may be appreciated that in one example, the transition space may correspond to a multi-dimensional space that may represent translated views between a plurality of texture images, and that merely a transitional space between the first texture image and the second texture image is described for simplicity. At 108, a first transition zone may be defined within the transition space based upon one or more first translated views being below an error threshold within the error basin. The first transition zone may define a first translated view experience for the one or more first translated views (e.g., a user may freely navigate within the one or more first translated views through the visualization using unrestricted navigation movement). In an example, a first translated view may correspond to a stove area of the renovated kitchen. The first translated view may have a relatively lower error within the error basin because the first texture image depicts a substantial portion of the stove area, and thus the first translated view may be accurately generated from the first texture image and/or other texture images (e.g., the textured geometry).

At 110, a second transition zone may be defined within the transition space based upon one or more second translated views being above the error threshold within the error basin. The second transition zone may define a second translated view experience for the one or more second translated views. The second translated view experience may specify restricted navigation movement for the one or more second translated views within the second transition zone. In an example, the restricted navigation movement may correspond to a snapback force from a current view position to a current view derived from at least one of the first texture image, the second texture image, or the first transition zone. For example, the user may attempt to navigate the visualization towards a ceiling of the renovated kitchen, which may be derived from a second translated view within the second transition zone. When a user pauses navigational movement, a snapback force (e.g., a subtle transitional pull) may be applied to transition the current view from the ceiling towards an area depicted by a texture image (e.g., the stove area depicted by the first texture image) or the first transitional zone. In this way, an interactive navigation experience of the scene, through the visualization, may be provided by one or more current views (e.g., a view of the scene currently provided by the visualization interface), such that navigation within the visualization may be defined based upon one or more transition zones. At 112, the method ends.

Figure 2A:
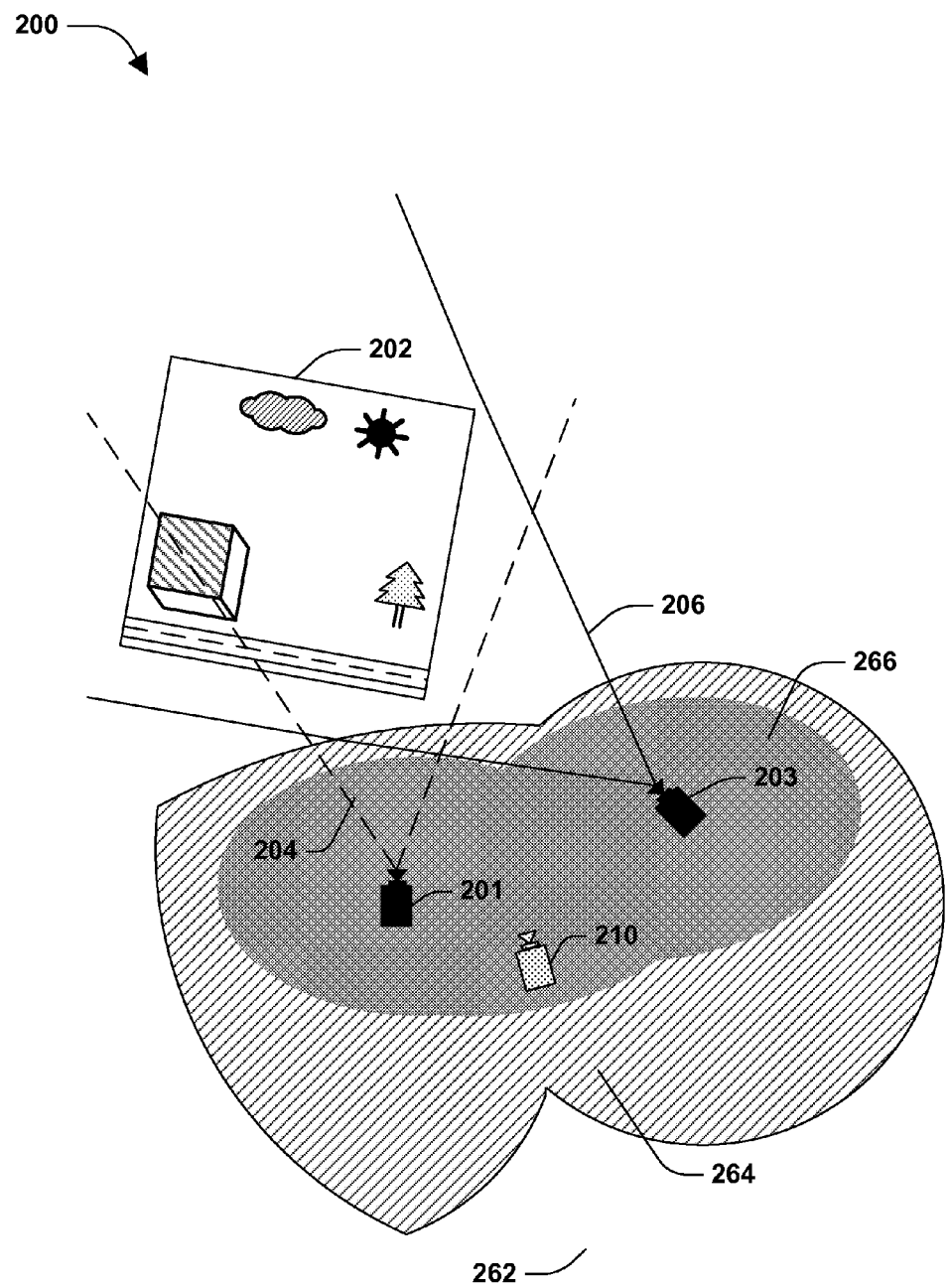
FIG. 2A is an illustration of an example of a first texture image and a second texture image depicting a scene.

FIG. 2A illustrates an example 200 of a first texture image 204 and a second texture image 206 depicting a scene 202. In an example, the scene 202 corresponds to an outdoor location comprising a building, a cloud, a sun, a tree, and a road. The first texture image 204 of the scene 202 may be captured from a first viewpoint. For example, a first camera 201 may capture a photo depicting the cloud, the sun, the tree, and a portion of the building. The second texture image 206 of the scene 202 may be captured from a second viewpoint. For example, a second camera 203 (e.g., which may be the first camera moved to a different location) may capture a photo depicting the entire scene 202. The first texture image 204, the second texture image 206, and/or other texture images may be used to create a visualization comprising a multi-dimensional representation of the scene 202 that may be navigated in multiple dimensions (e.g., a user may interact with the visualization to explore the scene 202 in three-dimensional space).

Figure 2B:
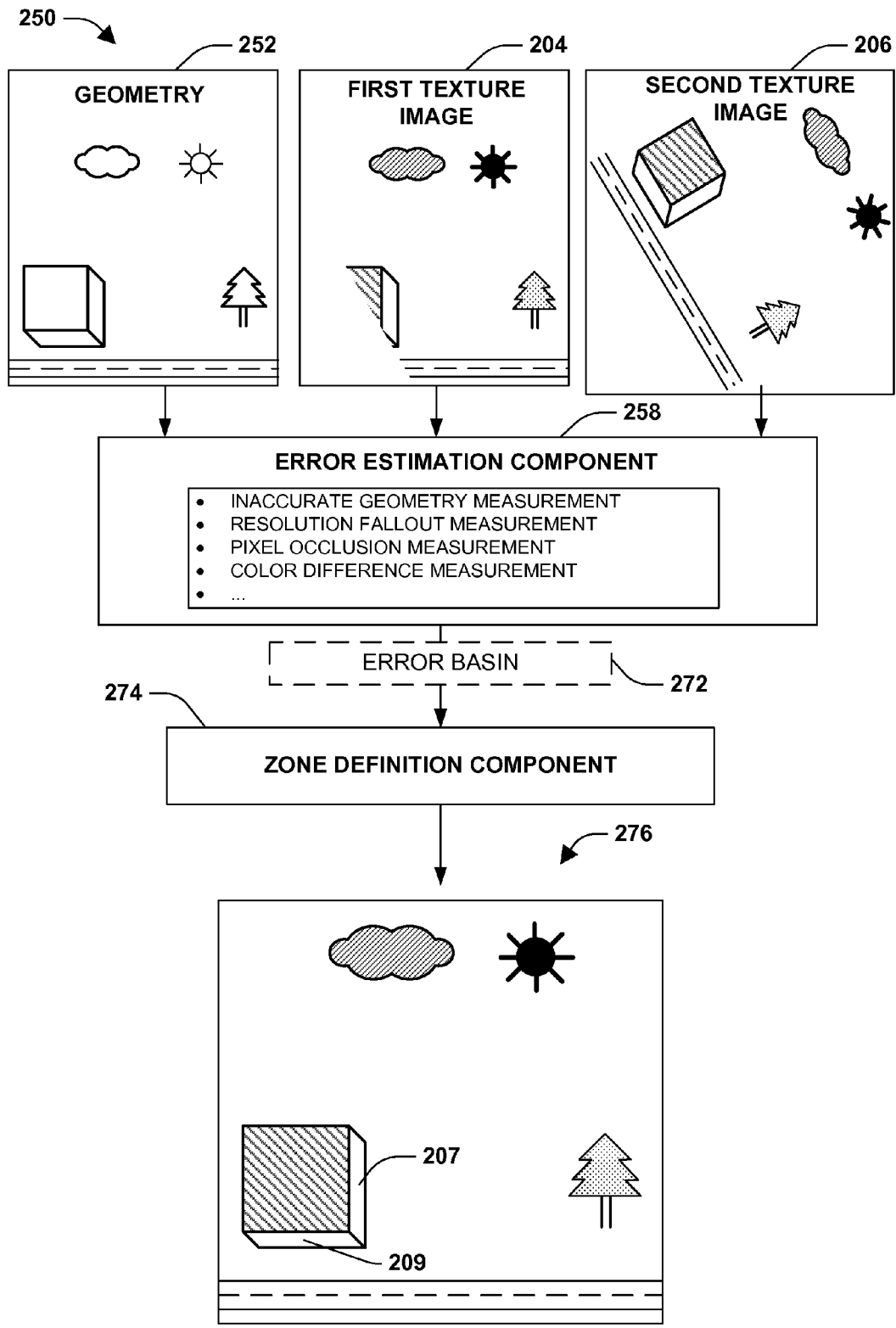
FIG. 2B is a component block diagram illustrating an exemplary system for defining transition zones for navigating a visualization.

FIG. 2B illustrates an example of a system 250 configured for defining transition zones for navigating a visualization 276. The system 200 may comprise an error estimation component 258 and/or a zone definition component 274. In an example, a geometry 252 may comprise a multi-dimensional representation of a surface of a scene, such as the scene 202 illustrated in a FIG. 2A. One or more textured images may be used to texture (e.g., assign color values to geometry pixels) the geometry 252 to create textured geometry. The textured geometry may be used to create one or more current views of a visualization representing the scene 202. For example, a first texture image 204 may depict the scene 202 from a first viewpoint, and a second texture image 206 may depict the scene from a second viewpoint. A current view of the scene 202 (e.g., viewed through the visualization 276) may directly correspond to the first texture image 204 (e.g., a current view of a cloud, a sun, a tree, and a portion of a building), directly correspond to the second texture image 206 (e.g., a current view of the cloud, the sun, the tree, and a rooftop and a couple of side portions of the building), or may correspond to a translated view derived from the textured geometry. Because the translated view may not directly correspond to a single texture image, the translated view may have a degree of visual error when displayed to a user. Accordingly, navigation between one or more translated views may be defined based upon one or more transition zones defined based upon an error basin 272.

The error estimation component 258 may be configured to determine the error basin 272 for a transition space between the first texture image 204 and the second texture image 206. In particular, the error estimation component 258 is configured to project the first texture image 204 and the second texture image 206 onto the geometry 252 to create textured geometry. The transition space may correspond to a portion of the textured geometry that is not entirely depicted by either the first texture image 204 nor entirely depicted by the second texture image 206. The error estimate component 258 may determine the error basin 272 for the transition space based upon a visual error measurement (e.g., a visual error between features of translated views between the first texture image and the second texture image; an accurate geometry measurement; a resolution fallout measurement; a pixel occlusion measurement; a color difference measurement; etc.).

The zone definition component 274 may be configured to define one or more transition zones for navigating the visualization 276 based upon the error basin 272, as illustrated in example 200 of FIG. 2A. It may be appreciated that in one example, navigation of the visualization 276 may correspond to multi-dimensional navigation, such as three-dimensional navigation, and that merely one-dimensional and/or two-dimensional navigation are illustrated for simplicity. It may be appreciated that in one example, a transition zone may represent multi-dimensional navigation, such as three-dimensional navigation within the visualization 276, and that merely a two-dimensional transition zone is illustrated for simplicity. In an example, the zone definition component 274 may define a first transition zone 266 within which a virtual camera 210 may transition through the scene as a rendering viewpoint to generate one or more current views of the scene. The first transition zone 266 may be defined based upon one or more first translated views being below an error threshold within the error basin 272 (e.g., a first translated view of the cloud, the tree, the sun, and the building (e.g., where a first side 207 of the building was facing the first camera 201 and the second camera 203 that respectively acquired the first texture image 204 and the second texture image 206) may have a relatively lower visual error because both the first texture image 204 and the second texture image 206 depict the first translated view). The first transition zone 266 may specify a first translated view experience (e.g., unrestricted multi-dimensional navigation movement (e.g., as 'viewed' through virtual camera 210)). For example, a user may freely navigate and/or pause within the first transition zone 266 while exploring the visualization 276.

The zone definition component 274 may define a second transition zone 264 within which the virtual camera 210 may transition through the scene as a rendering viewpoint to generate one or more current views of the scene. The second transition zone 264 may be defined based upon one or more second translated views being above the error threshold within the error basin 272 (e.g., a second translated view comprising a second side 209 of the building may have a relatively higher visual error because the second side 209 of the building is merely depicted by the second texture image 206 and/or was not directly facing the second camera 203 that acquired the second texture image 206). The second transition zone 264 may specify a second translated view experience (e.g., restricted multi-dimensional navigation movement). For example, a user may navigate within the second transition zone 264. However, responsive to a navigation pause, a current view position within the second transition zone 264 may be transitioned back to a current view associated with the first texture image 204, the second texture image 206, and/or the first transition zone 266. It will be appreciated that the zone definition component 274 may define one or more additional transition zones, such as a third transition zone 262 defining a third translated view experience (e.g., a snapback force may be applied during active navigation and/or a navigation pause (e.g., a 'view' through virtual camera 210 may be not be available)). In an example, the third transition zone may be associated with a relatively strong snapback force, for example, because a backside of the building is merely depicted by the second texture image 206 and/or there may be a relatively sparse amount of data available for the backside of the building because the backside of the building may be materially occluded by the first side 207 of the building when the second texture image 206 was acquired by the second camera 203 (e.g., given the orientation of the second camera 203 to the building when the second texture image 206 was acquired). Accordingly, there may be a relatively high degree of error associated with the third transition zone 262 as interpolation, filling, etc. may be employed to populate the third transition zone 262. Given the relatively high degree of error, sparse data available and/or limited user experience resulting therefrom in the third transition zone 262, user navigation within the third transition zone 262 may be substantially constrained, for example.

FIGS. 3A-3C illustrate examples of graphs generated by a graph component 302. In some embodiments, the graph component 302 is configured to generate a first graph 304 based upon one or more texture images depicting a scene from various viewpoints, as illustrated by example 300 of FIG. 3A. The first graph 304 comprises one or more nodes (e.g., a first node, a second node, a third node, and a fourth node) connected by one or more transitional edges. A node represents a texture image, and a transitional edge represents transition space between two texture images. Because the one or more nodes do not overlap (e.g., a first texture image, represented by the first node, depicts a first portion of a scene that does not overlap with a second portion of the scene depicted by a second texture image represented by the second node), transitional space along the one or more transitional edges may have relatively higher error (e.g., error resulting from occlusion because portions of the scene are not depicted by the one or more texture images). Thus, an error basin may have relatively higher error estimates for transitional space corresponding to the non-overlapping portions.

In some embodiments, the graph component 302 is configured to generate a second graph 334 based upon one or more texture images depicting a scene from various viewpoints, as illustrated by example 330 of FIG. 3B. The second graph 334 comprises one or more nodes connected by one or more transitional edges, where a node represents a texture image. Because at least some of the nodes overlap (e.g., a first texture image depicts a stove area and a refrigerator area of a renovated kitchen, and a second texture image depicts the stove area and an island area of the renovated kitchen), transitional space corresponding to overlapping portions may have relatively lower error because multiple texture images may depict portions of the scene. Transitional space corresponding to non-overlapping portions 336 may have relatively higher error because some portions of the scene may not be depicted or may be merely depicted by a single texture image. Thus, an error basin may have relatively higher error estimates for transitional space corresponding to non-overlapping portions 336 and relatively lower error estimates for transitional space corresponding to overlapping portions.

In some embodiments, the graph component 302 is configured to generate a third graph 364 based upon one or more texture images depicting a scene from various viewpoints, as illustrated by example 360 of FIG. 3C. The third graph 336 comprises one or more nodes connected by one or more transitional edges, where a node represents a texture image. Because the one or more nodes overlap, transitional space along the one or more transitional edges may have relatively lower error because multiple texture images may depict portions of the scene. Thus, an error basin may have relatively lower error estimates for transitional space corresponding to the overlapping portions.

Figure 4:
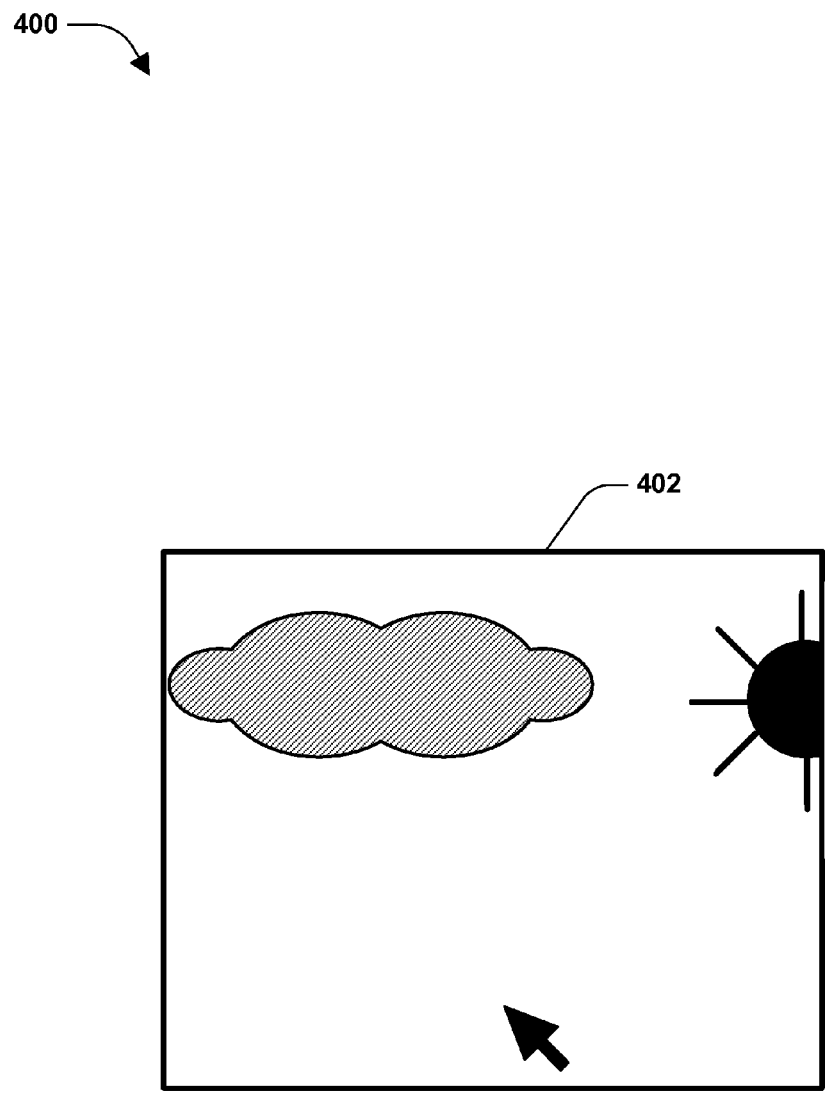
FIG. 4 is an illustration of an example of unrestricted navigation movement for a current view of a visualization.

FIG. 4 illustrates an example 400 of unrestricted navigation movement for a current view of a visualization. In an example, the visualization corresponds to a visualization 276 of a scene depicting a building and outdoor space, as illustrated in example 250 of FIG. 2B. The visualization 276 may have been derived from one or more texture images, such as a first texture image 204 and a second texture image 206 of FIG. 2B. In an example, a user may navigate to a current view 402 depicting a cloud and a portion of a sun. The current view 402 may correspond to the first texture image 204 of the scene. Because the current view 402 corresponds to the first texture image 204, the user may be allowed to freely navigate from the current view 402 to a new view that also corresponds to the first texture image 204 without a snapback force and/or other restrictions.

Figure 5:
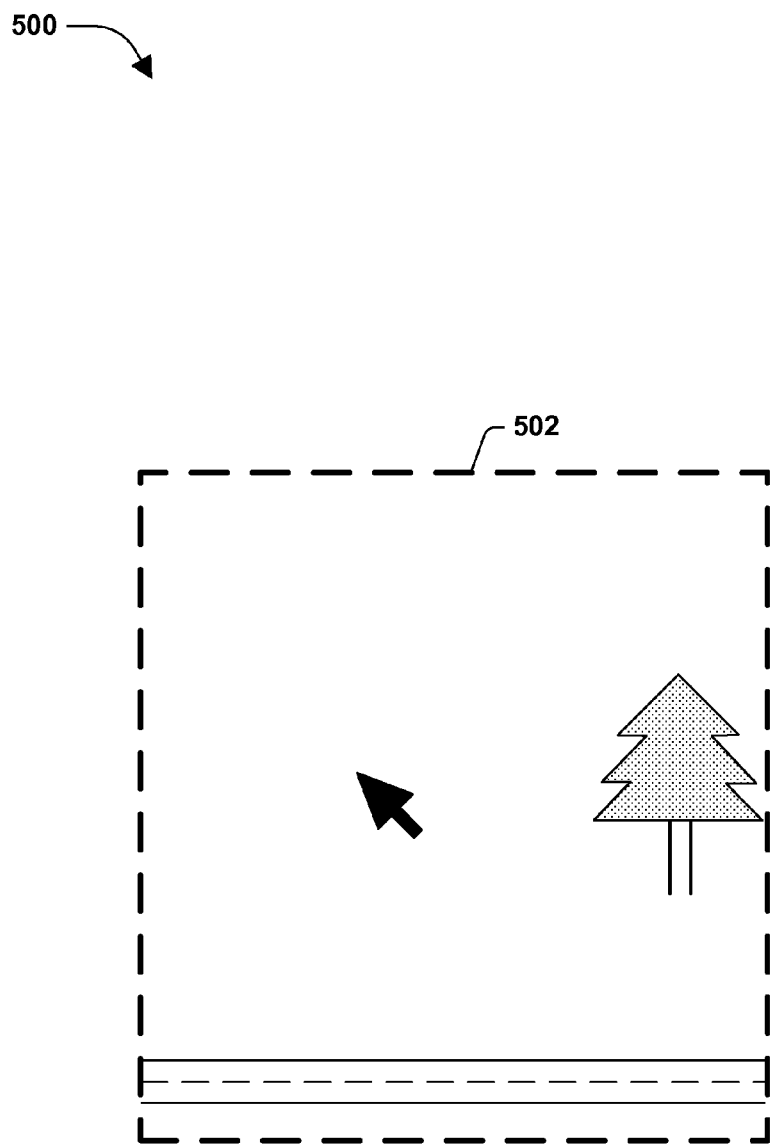
FIG. 5 is an illustration of an example of unrestricted navigation movement for one or more first translated views of a visualization.

FIG. 5 illustrates an example 500 of unrestricted navigation movement for one or more first translated views of a visualization. In an example, the visualization corresponds to a visualization 276 of a scene depicting a building and outdoor space, as illustrated in example 250 of FIG. 2B. One or more transition zones may have been defined for a transition space of the visualization 276. For example, a first transition zone 266 may specify that a first transition view experience, such as unrestricted navigation movement, is to be used when a user navigates within the first transition zone 266. For example, a user may navigate to a current view 502 depicting a tree and a street from a northwestern facing viewpoint. The current view 502 may correspond to a translated view within the first transition zone 266. For example, the first texture image 204 may depict the tree from a northern facing viewpoint and the second texture image 206 may depict the tree from an western facing viewpoint, such that both the first texture image 204 and the second texture image 206 are used to create the current view 502 depicting the tree from the northwestern facing viewpoint (e.g., the first texture image 204 and the second texture image 206 may be projected onto a geometry representing a three-dimensional surface of the tree). Because the current view 502 is within the first transition zone 266, the user may be allowed to freely navigate from the current view 502 to a new view within the first transition zone 266 without a snapback force and/or other restrictions.

Figure 6:
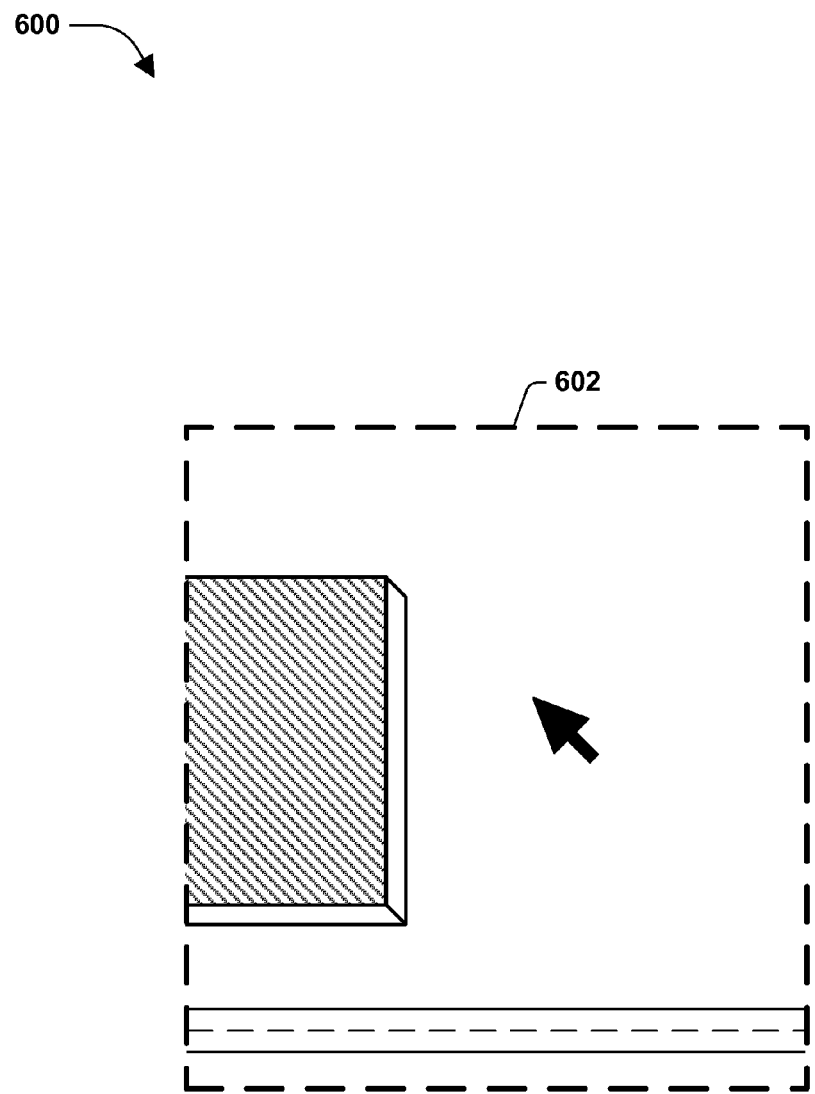
FIG. 6 is an illustration of an example of restricted navigation movement for one or more second translated views of a visualization.

FIG. 6 illustrates an example 600 of restricted navigation movement for one or more second translated views of a visualization. In an example, the visualization corresponds to a visualization 276 of a scene depicting a building and outdoor space, as illustrated in example 250 of FIG. 2B. One or more transition zones may have been defined for a transition space of the visualization 276. For example, a second transition zone 264 may specify that a second transition view experience, such as restricted navigation movement (e.g., a snapback force and/or other view movement restrictions may be applied during navigation and/or during a navigation pause), is to be used when a user navigates within the second transition zone 264. For example, a user may navigate to a current view 602 depicting a building. The current view 602 may correspond to a translated view within the second transition zone 264. Because the current view 602 is within the second transition zone 264, the user may be allowed to navigate within the second transition zone 264. Responsive to a navigation pause, a snapback force may "pull" the current view 602 to a new view (e.g., a view corresponding to a first transition zone 266 or a view derived from a texture image). That is, the user may visually explore the scene within the second transition zone 264, but when the user pauses on a particular view, the snapback force may translate the view to a new view corresponding to a first texture image 204, a second texture image 206, or the first transition zone 266 of FIG. 2B. It will be appreciated that navigation movement may be even further constrained in a transition zone corresponding to third transition zone 262 as illustrated in FIG. 2B, for example.

Figure 7:
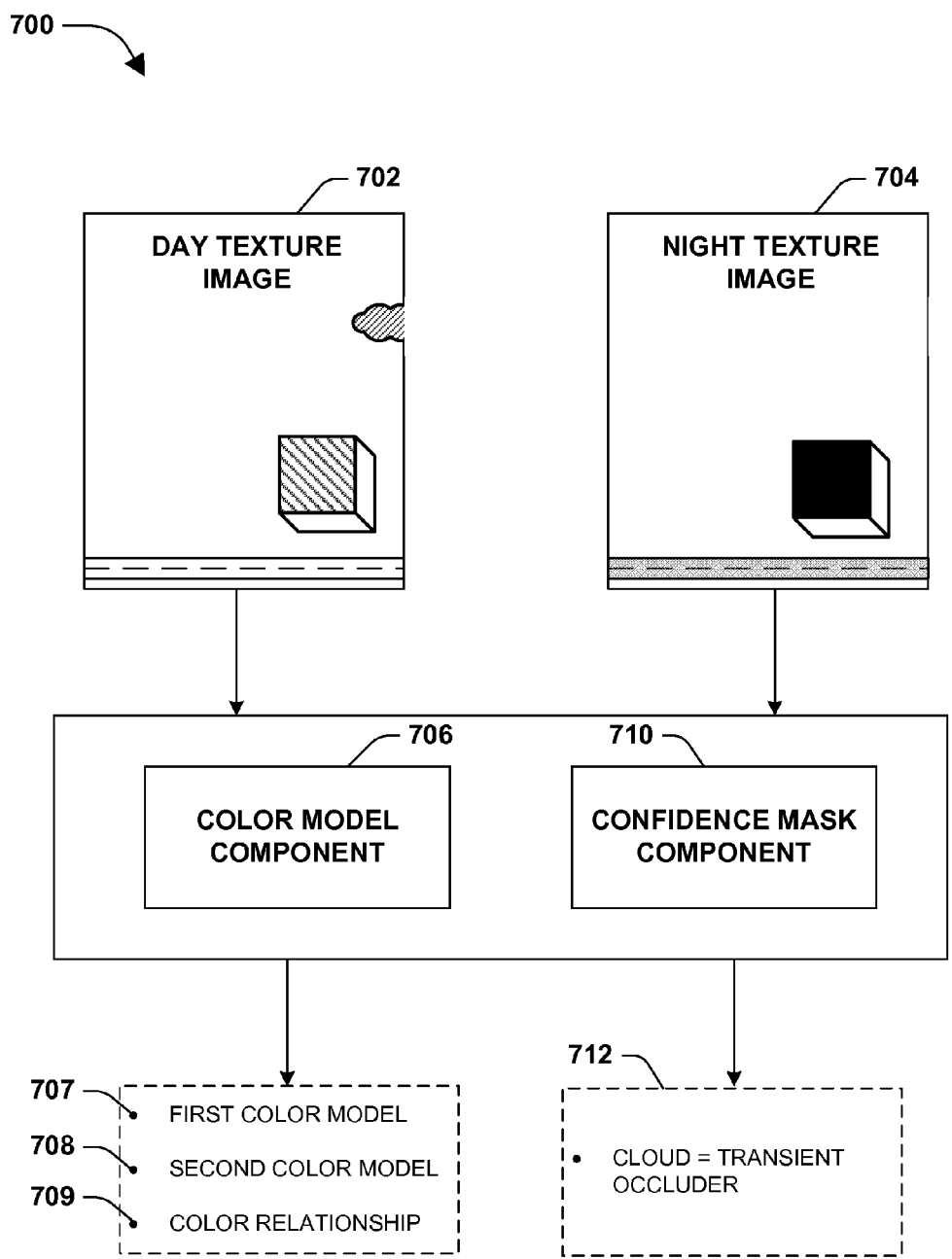
FIG. 7 is a component block diagram illustrating an exemplary system for generating a confidence mask and/or for generating a color relationship.

FIG. 7 illustrates an example of a system 700 configured for generating a confidence mask and/or for generating a color relationship. The system 700 comprises a color model component 706 and/or a confidence mask component 710. The color model component 706 may be configured to generate a first color model 707 for a day texture image 702 depicting a scene during daylight hours (e.g., the day texture image 702 may depict a cloud and a relatively well light view of a building and street). The color model component 706 may be configured to generate a second color model 708 for a night texture image 704 depicting the scene during nighttime hours (e.g., the night texture image 704 may depict a shadowy building and street). The color model component 706 may be configured to establish a color relationship 709 between the day texture image 702 and the night texture image 704 based upon the first color model 707 and the second color model 708. The color model component 706 may be configured to blend color from the first texture image 702 and/or the second texture image 704 to create a current translated view of the scene. The current translated view may be displayed through a visualization interface.

The confidence mask component 710 may be configured to generate a confidence mask comprising one or more pixel confidences. In an example, the confidence mask is generated based upon image features, inaccurate geometry measurements, resolution fallout measurements, pixel occlusion measurements, color difference measurements, and/or other image information. In an example, a first pixel confidence may be generated for a first geometry pixel of a geometry representing a multi-dimensional surface of a scene. The first pixel confidence may specify a confidence that an object (e.g., a portion of a cloud corresponding to the first geometry pixel) is represented in both a first texture image 702 and a second texture image 704. Responsive to the first pixel confidence being below a confidence threshold, the confidence mask component 710 may determine that the first geometry pixel corresponds to a transient occluder 712 (e.g., the cloud may be present in the first texture image 702, but not in the second texture image 704). In an example, the confidence mask component 710 may modify the first geometry pixel based upon a blending technique, an inpaint technique, a shading technique, a fadeout technique, and/or other techniques to compensate for the transient occluder 712.

Figure 8:
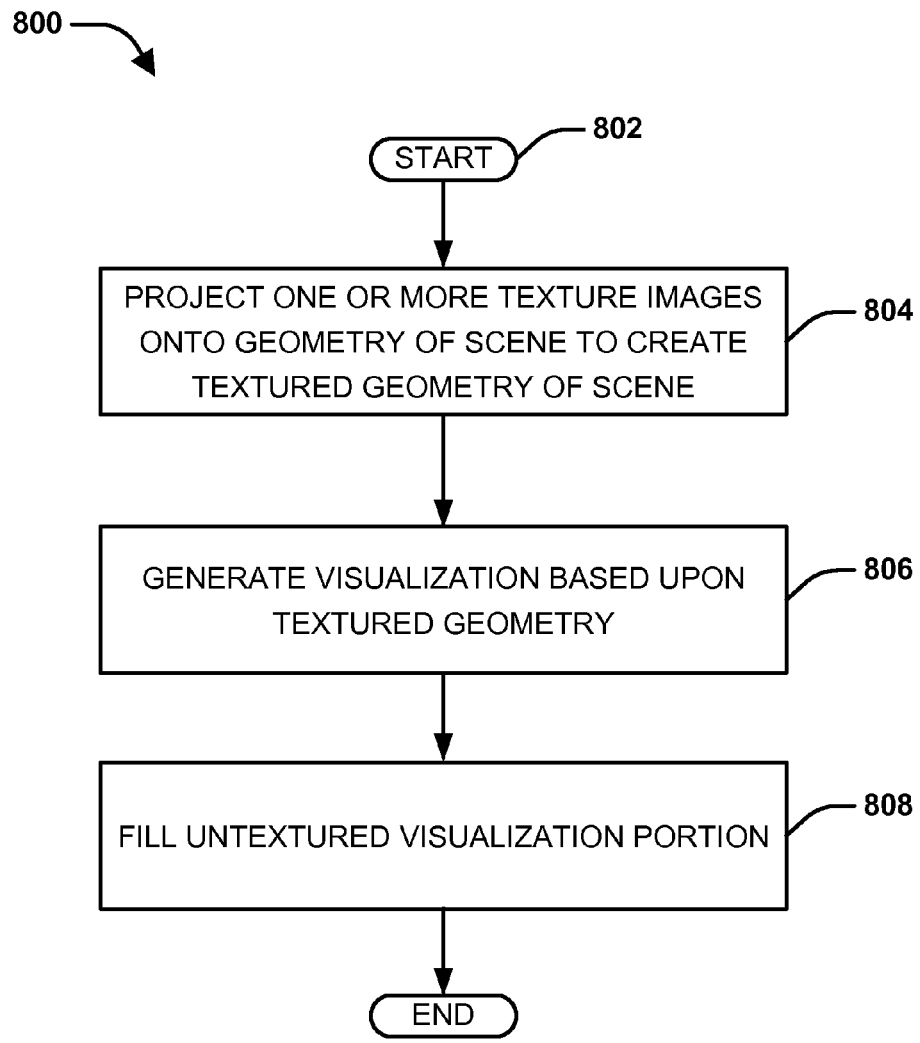
FIG. 8 is a flow diagram illustrating an exemplary method of filling an untextured visualization portion of a visualization.

An embodiment of filling an untextured visualization portion of a visualization is illustrated by an exemplary method 800 of FIG. 8. At 802, the method starts. At 804, one or more texture images may be projected onto a geometry of a scene to create a textured geometry of the scene. For example, the geometry may represent a multi-dimensional surface of the scene depicted by the one or more texture images. The one or more texture images may be projected onto the geometry to assign texture, such as color values, to geometry pixels of the geometry. Because the one or more texture images may not depict every portion of the scene (e.g., a rooftop of a building may not be depicted or "seen by" by one or more textured images depicting the building and an outdoor space), the textured geometry may comprise an untextured geometry portion that is not depicted by at least one texture image.

At 806, a visualization of the scene may be generated based upon the textured geometry. The visualization may comprise an untextured visualization portion corresponding to the untextured geometry portion (e.g., the untextured visualization portion may correspond to a portion of the scene for which relatively minimal to no image data is available). At 808, the untextured visualization portion may be filled (e.g., textured or inpainted). In an example, low resolution imagery, depicting the portion of the scene corresponding to the unextured visualization portion, may be used to inpaint the untextured visualization portion with relatively low resolution image information. In another example, a neighboring pixel region may be expanded to visually cover at least a portion of the untextured visualization portion (e.g., multiple neighboring pixel regions may be expanded to visually cover all or substantially all of the untextured visualization portion). In another example, a circular (e.g., or other shaped) image transition window may be displayed (e.g., to visually cover at least a portion of the untextured visualization portion). The circular image transition window may be configured to transition a current view of the scene to a texture image (e.g., a texture image depicting the neighboring pixel region). In one example, the circular image transition window may be displayed while the visualization is in an overview mode (e.g., a zoomed out state). In another example, the circular image transition window may be displayed during other modes, such as regular viewing modes, to indicate where additional imagery of the scene (e.g., the texture image) may be available (e.g., a user may be able to jump from a first street side bubble to a second street side bubble utilizing the circular image transition window).

Figure 9:
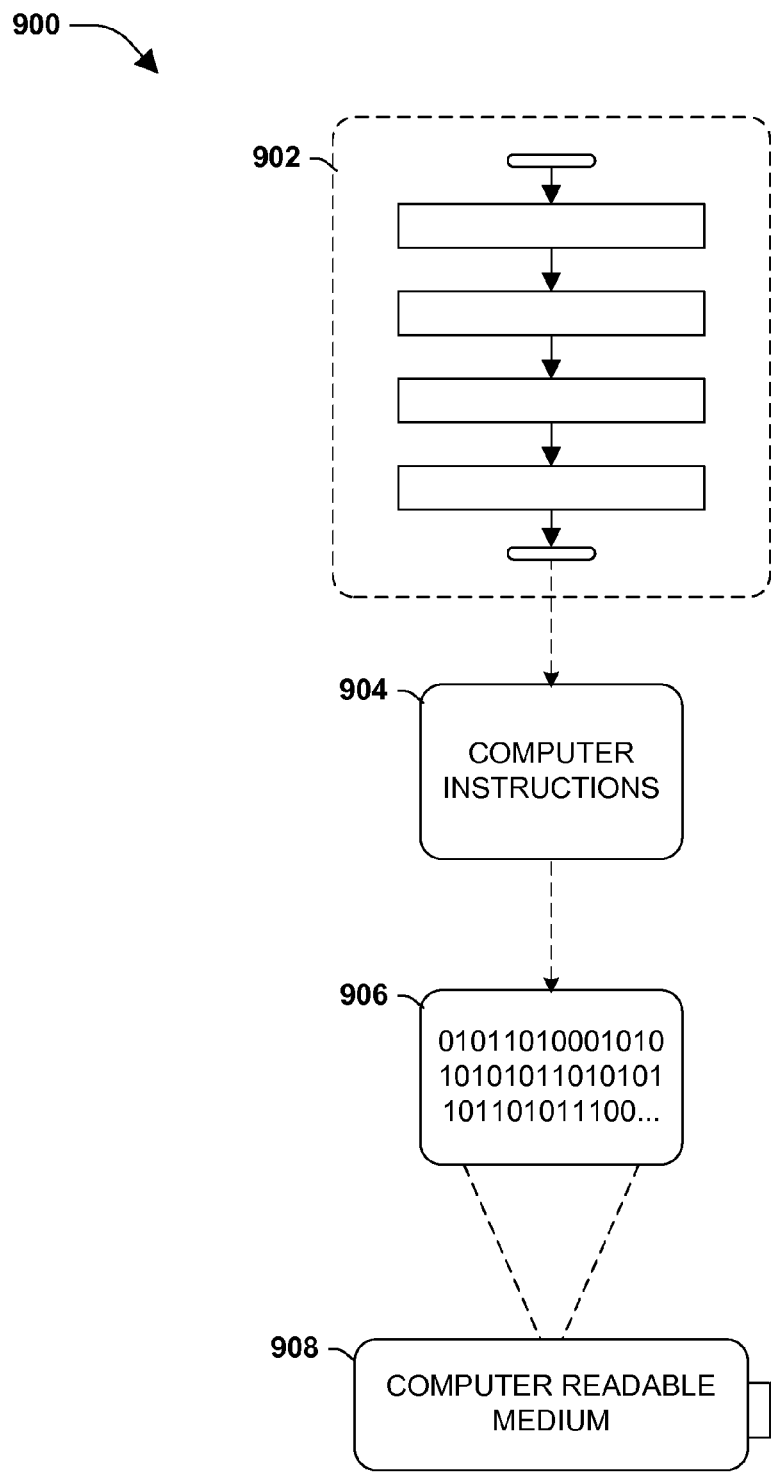
FIG. 9 is an illustration of an exemplary computing device-readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 9, wherein the implementation 900 comprises a computer-readable medium 908, such as a CD-R, DVD-R, flash drive, a platter of a hard disk drive, etc., on which is encoded computer-readable data 906. This computer-readable data 906, such as binary data comprising at least one of a zero or a one, in turn comprises a set of computer instructions 904 configured to operate according to one or more of the principles set forth herein. In some embodiments, the processor-executable computer instructions 904 are configured to perform a method 902, such as at least some of the exemplary method 100 of FIG. 1, for example. In some embodiments, the processor-executable instructions 904 are configured to implement a system, such as at least some of the exemplary system 250 of FIG. 2B and/or at least some of the exemplary system 700 of FIG. 7, for example. Many such computer-readable media are devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component is localized on one computer or distributed between two or more computers.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 10:
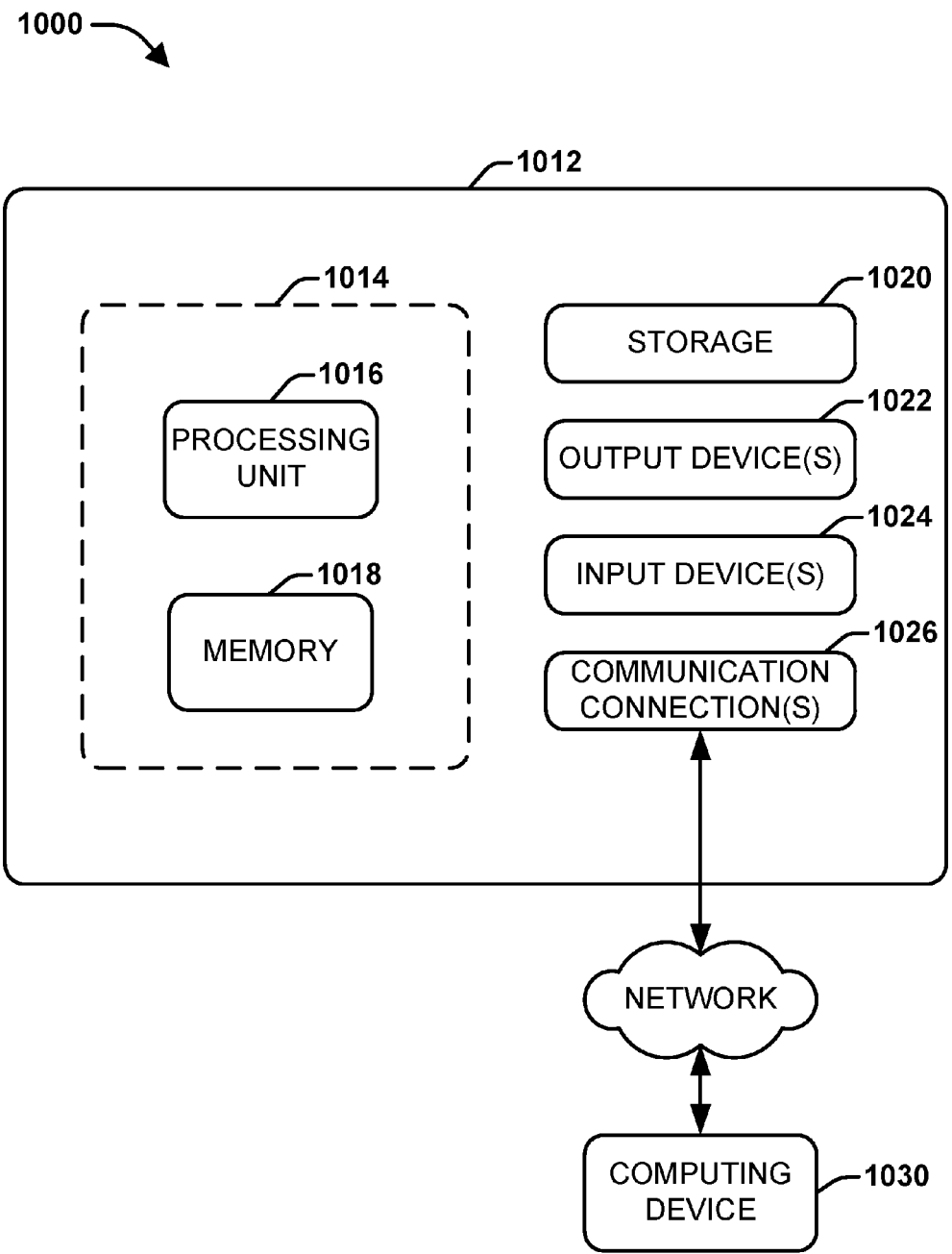
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only an example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions are implemented as program modules, such as functions, objects, Application Programming Interfaces (APIs), data structures, and the like, that perform particular tasks or implement particular abstract data types. Typically, the functionality of the computer readable instructions are combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. In some embodiments, depending on the exact configuration and type of computing device, memory 1018 is volatile, such as RAM, non-volatile, such as ROM, flash memory, etc., or some combination of the two. This configuration is illustrated in FIG. 10 by dashed line 1014.

In other embodiments, device 1012 includes additional features or functionality. For example, device 1012 also includes additional storage such as removable storage or non-removable storage, including, but not limited to, magnetic storage, optical storage, and the like. Such additional storage is illustrated in FIG. 10 by storage 1020. In some embodiments, computer readable instructions to implement one or more embodiments provided herein are in storage 1020. Storage 1020 also stores other computer readable instructions to implement an operating system, an application program, and the like. Computer readable instructions are loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media is part of device 1012.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 1012 includes input device(s) 1024 such as keyboard, mouse, pen, voice input device, touch input device, infrared cameras, video input devices, or any other input device. Output device(s) 1022 such as one or more displays, speakers, printers, or any other output device are also included in device 1012. Input device(s) 1024 and output device(s) 1022 are connected to device 1012 via a wired connection, wireless connection, or any combination thereof. In some embodiments, an input device or an output device from another computing device are used as input device(s) 1024 or output device(s) 1022 for computing device 1012. Device 1012 also includes communication connection(s) 1026 to facilitate communications with one or more other devices 1030.

Although the subject matter has been described in language specific to structural features and/or methodological acts, it is to be understood that the subject matter of the appended claims is not necessarily limited to the specific features or acts described above. Rather, the specific features and acts described above are disclosed as example forms of implementing the claims.

Various operations of embodiments are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

It will be appreciated that layers, features, elements, etc. depicted herein are illustrated with particular dimensions relative to one another, such as structural dimensions and/or orientations, for example, for purposes of simplicity and ease of understanding and that actual dimensions of the same differ substantially from that illustrated herein, in some embodiments.

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A method for defining transition zones for navigating a visualization of a scene, comprising:
   utilizing a computing device to project a first texture image and a second texture image onto a geometry of a scene to create a textured geometry of the scene;
   determining, via the computing device, an error basin for a transition space between the first texture image and the second texture image based upon a visual error measurement, the transition space based upon the textured geometry;
   defining, by the computing device, a first transition zone within the transition space based upon one or more first translated views being below an error threshold within the error basin, the first transition zone specifying a first translated view experience for the one or more first translated views;
   defining, by the computing device, a second transition zone within the transition space based upon one or more second translated views being above the error threshold within the error basin, the second transition zone defining a second translated view experience for the one or more second translated views;
   receiving a navigation request from a user, the request including a navigation pause within the second transition zone; and
   responsive to the navigation pause, transitioning a current view position within the second transition zone to an alternative current view.

2. The method of claim 1, wherein the visual error measurement comprises at least one of:
   an inaccurate geometry measurement;
   a resolution fallout measurement;
   a pixel occlusion measurement; or
   a color difference measurement.

3. The method of claim 1, wherein the first translated view experience specifies unrestricted navigation movement for the one or more first translated views within the first transition zone.

4. The method of claim 1, wherein the second translated view experience specifies the restricted navigation movement, the restricted navigation movement corresponding to a snapback force from a current view position to at least one of the first texture image, the second texture image, or the first transition zone.

5. The method of claim 1, wherein at least one of the first texture image or the second texture image comprises at least one of:
   a panorama image;
   a photo image;
   a generated image; or
   an orthographic image from an aerial viewpoint.

6. The method of claim 1, further comprising:
   generating a graph representing one or more texture images available to texture the geometry, the graph comprising a first node representing the first texture image, a second node representing the second texture image, and a transitional edge between the first node and the second node, the transitional edge corresponding to the transition space.

7. The method of claim 6, wherein the determining an error basin comprises:
   obtaining a first image feature of a first rendered view of the scene at a first point along the transitional edge, the first rendered view based upon the textured geometry;
   obtaining a second image feature of a second rendered view of the scene at a second point along the transitional edge, the second rendered view based upon the textured geometry; and determining the visual error measurement based upon a comparison of the first image feature of the first rendered view to the second image feature of the second rendered view.

8. The method of claim 1, further comprising:
generating a confidence mask comprising one or more pixel confidences, a first pixel confidence of a first geometry pixel specifying a confidence that an object, associated with the first geometry pixel, is represented in both the first texture image and the second texture image.

9. The method of claim 8, further comprising:
responsive to the first pixel confidence being below a confidence threshold:
  determining that the first geometry pixel corresponds to a transient occluder; and
  modifying the first geometry pixel based upon at least one of a blending technique, an inpaint technique, a shading technique, or a fadeout technique.

10. The method of claim 1, further comprising:
generating a first color model for the first texture image and a second color model for the second texture image; and
establishing a color relationship between the first texture image and the second texture image based upon the first color model and the second color model.

11. The method of claim 10, further comprising:
blending color from the first texture image and the second texture image based upon the color relationship to create a current translated view of the scene.

12. The method of claim 1, further comprising:
providing an interactive navigation experience of the scene through one or more current views, the one or more current views comprising a current translated view provided based upon the first translated view experience or the second translated view experience.

13. The method of claim 1, further comprising:
defining one or more additional transition zones based upon the error basin.

14. The method of claim 1, wherein the alternative current view is associated with the first transition zone.

15. A system for defining transition zones for navigating a visualization of a scene, comprising:
a computer-readable storage device that stores a first set of instructions that when executed by a computing device provides error estimation by implementing the following steps:
  projecting a first texture image and a second texture image onto a geometry of a scene to create a textured geometry of the scene; and
  determining an error basin for a transition space between the first texture image and the second texture image based upon a visual error measurement, the transition space based upon the textured geometry; and
the computer-readable storage device that stores a second set of instructions that when executed by the computing device provides zone definition by implementing the following steps:
  defining a first transition zone within the transition space based upon one or more first translated views being below an error threshold within the error basin, the first transition zone specifying a first translated view experience for the one or more first translated views;
  defining a second transition zone within the transition space based upon one or more second translated views being above the error threshold within the error basin, the second transition zone defining a second translated view experience for the one or more second translated views;
  receiving a navigation request from a user, the request including a navigation pause within the second transition zone; and
  responsive to the navigation pause, transitioning a current view position within the second transition zone to an alternative current view.

16. The system of claim 15, further comprising:
a color model component configured to:
generate a first color model for the first texture image and a second color model for the second texture image; and
establish a color relationship between the first texture image and the second texture image based upon the first color model and the second color model.

17. The system of claim 16, wherein the color model component is configured to:
blend color from the first texture image and the second texture image based upon the color relationship to create a current translated view of the scene.

18. The system of claim 15, further comprising:
a confidence mask component configured to:
generate a confidence mask comprising one or more pixel confidences, a first pixel confidence of a first geometry pixel specifying a confidence that an object, associated with the first geometry pixel, is represented in both the first texture image and the second texture image.

19. The system of claim 18, wherein the confidence mask component is configured to:
responsive to the first pixel confidence being below a confidence threshold:
  determine that the first geometry pixel corresponds to a transient occluder; and
  modify the first geometry pixel based upon at least one of a blending technique, an inpaint technique, a shading technique, or a fadeout technique.

20. The system of claim 15, further comprising:
a graph component configured to:
generate a graph representing one or more texture images available to texture the geometry, the graph comprising a first node representing the first texture image, a second node representing the second texture image, and a transitional edge between the first node and the second node, the transitional edge corresponding to the transition space.

* * * * *